US008675085B2

(12) United States Patent
Beckers et al.

(10) Patent No.: US 8,675,085 B2
(45) Date of Patent: Mar. 18, 2014

(54) CAMERA THAT COMBINES IMAGES OF DIFFERENT SCENE DEPTHS

(76) Inventors: James Randall Beckers, Rockville, MD (US); William H. Culver, Washington, DC (US)

( * ) Notice: Subject to any disclaimer, the term of this patent is extended or adjusted under 35 U.S.C. 154(b) by 48 days.

(21) Appl. No.: 12/835,858

(22) Filed: Jul. 14, 2010

(65) Prior Publication Data

US 2012/0013757 A1    Jan. 19, 2012

(51) Int. Cl.
H04N 5/225 (2006.01)
H04N 5/232 (2006.01)
G03B 13/00 (2006.01)

(52) U.S. Cl.
USPC ............... 348/218.1; 348/211.11; 348/345

(58) Field of Classification Search
USPC ............ 348/211.13, 345, 346, 354, 211.11, 348/218.1, 222.1, 356
See application file for complete search history.

(56) References Cited

U.S. PATENT DOCUMENTS

| | | | | |
|---|---|---|---|---|
| 6,639,626 B1 * | 10/2003 | Kubo et al. | ................ | 348/218.1 |
| 7,834,928 B2 * | 11/2010 | Misawa et al. | ................ | 348/345 |
| 2002/0152557 A1 * | 10/2002 | Elberbaum | ................ | 8/405 |
| 2003/0122930 A1 * | 7/2003 | Schofield et al. | ................ | 348/148 |
| 2004/0080661 A1 * | 4/2004 | Afsenius et al. | ................ | 348/345 |
| 2004/0175038 A1 * | 9/2004 | Bonner et al. | ................ | 382/181 |
| 2006/0198623 A1 * | 9/2006 | Ono | ................ | 396/89 |
| 2007/0116447 A1 * | 5/2007 | Ye | ................ | 396/79 |
| 2008/0176598 A1 * | 7/2008 | Hur | ................ | 455/556.1 |
| 2008/0218611 A1 * | 9/2008 | Parulski et al. | ................ | 348/262 |
| 2008/0266414 A1 * | 10/2008 | Park | ................ | 348/222.1 |
| 2009/0169122 A1 * | 7/2009 | He et al. | ................ | 382/238 |
| 2010/0118297 A1 * | 5/2010 | Liu et al. | ................ | 356/237.5 |
| 2010/0166337 A1 * | 7/2010 | Murashita et al. | ................ | 382/284 |
| 2010/0172585 A1 * | 7/2010 | Murashita et al. | ................ | 382/168 |
| 2010/0290773 A1 * | 11/2010 | Ichimiya | ................ | 396/111 |
| 2011/0200319 A1 * | 8/2011 | Kravitz et al. | ................ | 396/333 |

* cited by examiner

Primary Examiner — Lin Ye
Assistant Examiner — Euel Cowan
(74) Attorney, Agent, or Firm — Staas & Halsey LLP

(57) ABSTRACT

A camera system capturing two parts of a same scene each at a different focus so that objects at different distances from the camera can be captured in focus. The camera system splits the image into two paths using a splitter and focuses the image of each path separately. The focus for each path can be manual or by autofocus. The parts of the images of the two paths can be combined by abutting them at a boundary or in a zone essentially located between the two parts. The image parts in the zone can be combined by blending using a linear function or a non linear function such as a frequency based function.

13 Claims, 4 Drawing Sheets

CAMERA THAT COMBINES IMAGES OF DIFFERENT SCENE DEPTHS

BACKGROUND

The subject matter of the embodiments discussed herein is related to capturing images at different depths within a scene and producing an image where objects at different depths are in focus.

SUMMARY

A camera system capturing two parts of a same scene each at a different focus so that objects at different distances from the camera can be captured in focus. The camera system splits the image into two paths and focuses the image of each path separately. The focus for each path can be manual or by autofocus. The parts of the images of the two paths can be combined in a zone essentially located between the two parts. The image parts in the zone can be combined by blending using linear and non linear functions.

DETAILED DESCRIPTION OF THE EMBODIMENTS

Figure 1:
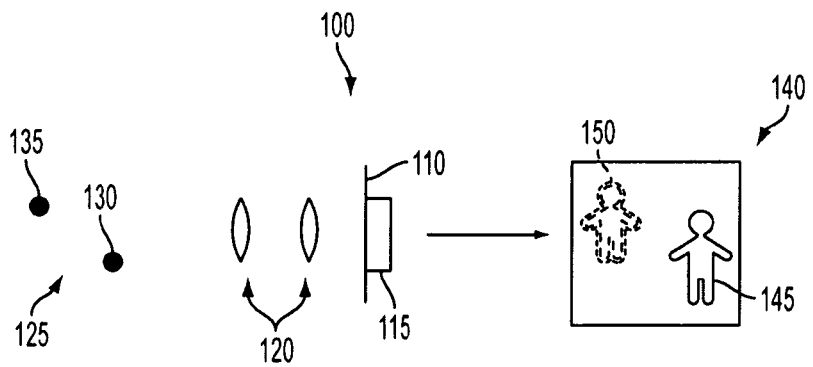
FIG. 1 illustrates a camera capturing a view of a scene with objects at different depths.

A typical camera 100, still or motion/video, includes an image capture plane 110 where an image capture mechanism or device 115, such as film or a light sensor, such as a CCD sensor, is positioned (see FIG. 1). Lenses 120 are used to focus an image on the capture plane and the capture an image of a scene 125. The scene 125 can have objects 130 that are near the camera as well as objects 135 that are far from the camera 100. When the camera 110 is focused on the near object 130, unless the depth of field is very deep, the far object 135 will be out of focus. In this situation, the captured image 140 will have the closest object 145 in focus and the farthest object 150 out of focus. The same thing happens when the far object is the object of focus; it is in focus and the near object is out of focus.

Figure 2:
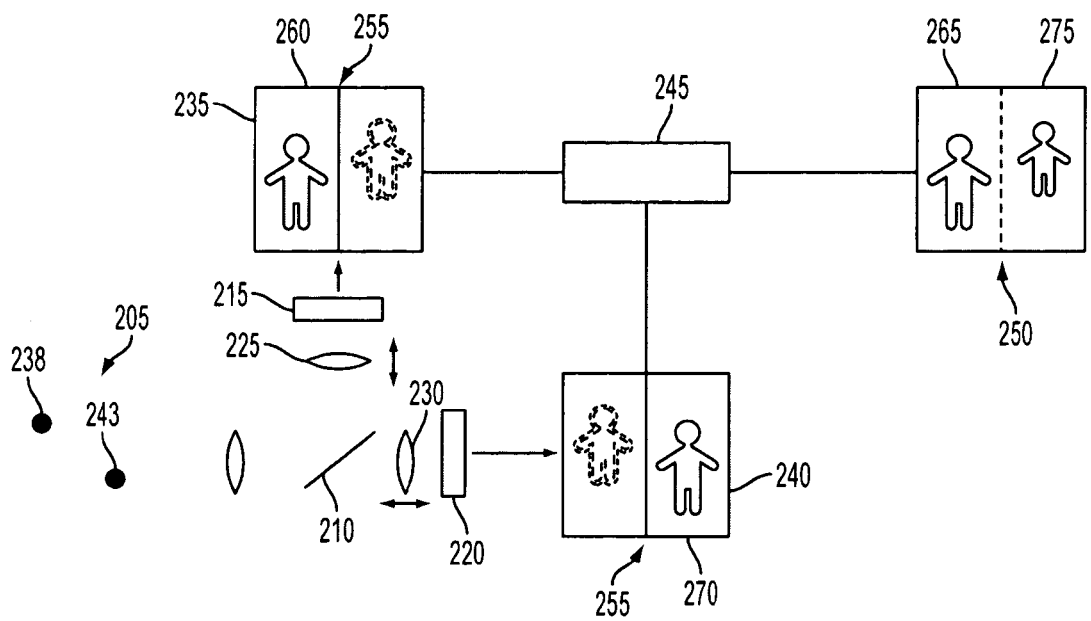
FIG. 2 depicts a system that captures two images with objects at different focus depths and combines the images to produce an image with both objects in focus.

FIG. 2 illustrates a (still or motion) camera system 200 in which an image of the scene 205 is split by an image splitter 210 and simultaneously captured by at least two image capture devices 215 and 220. Each of the image paths can allow the image to be independently focused on the respective image capture device 215/220 via focus lenses 225/230 (such as manually by one or more camera operators or automatically by autofocus). In this way, the far object can be in focus on one image capture device 215 and the near object can be in focus on the other image capture device 220. Two images are produced, one image 235 with the far object 238 in focus (and near object out of focus) and the other image 240 with the near object 243 in focus (and the far object out of focus). The images 235 and 240 from the two capture devices 215 and 220 are supplied to an image combiner 245. The image combiner 245 combines the two images 235 and 240 producing a combined image 250 in which both the near and far objects are in focus.

This can be accomplished by dividing the two images 235 and 240 along an image division boundary 255 and combining pixels from two images 235 and 240 responsive to the boundary line 255. For example, the pixels from the left half 260 of the far focus image 235 can be input to or placed in the left side 265 of the combined image 250 and pixels from the right half 270 of the near focus image 240 can be input to the right side 275 of the combined image 250. The combined image 250 can then be viewed on a display of the camera, stored in an image memory of the camera for future viewing, printing or processing, such as for image quality adjustments like contrast enhancement or brightening, and/or transmitted for viewing at another location. The images 235 and 240 that include both a focused object and an unfocused object can also be displayed, stored or transmitted.

The image combiner 245 can be a dedicated circuit that selects pixels from the sensors according to the boundary line and stores them in a combined image memory as the sensors output the image pixels. The combiner 245, alternatively, can be a camera processor (or computer) of the camera that includes sufficient memory to input the images from both sensors, produce the combined image and to store the combined image. The combiner 245 can be a processing system that receives the images and processes them, such as a high speed server type computer that receives the images over a communication network.

Figure 3:
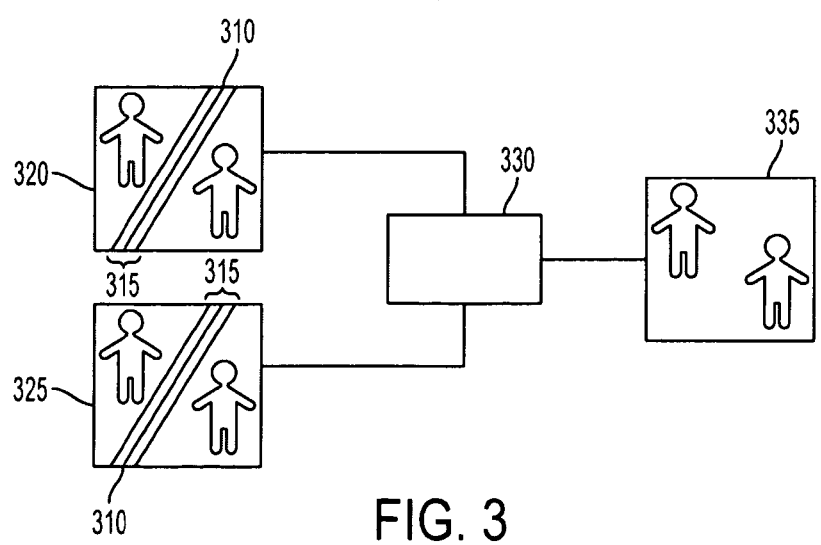
FIG. 3 shows a blending technique.

Rather than having a fixed boundary line where pixels on one side from one image are stored in the combined image and pixels on the other side of the line in the other image are stored in the combined image, the boundary line can be "fuzzy". For example, the boundary line 310 can define a zone 315 (see FIG. 3) where the images 320 and 325 from the two sources or sensors are combined by the combiner 330 into a combined image 335 based on some combining technique. For example, the pixels can be combined or blended based on a ratio defined by the boundaries of the zone 315.

The ratio can be a linear ratio based on the distance of a pixel in the zone 315 from the boundary line 310. The pixel next to and just inside the left boundary of the zone 315 can be made up of 9 parts of the left side of the first image 320 and 1 part of the left side of the second image 325 while the zone pixel next to and just inside the right boundary can be 9 parts of the right side of the second image 325 and 1 part right side of the first image 320 and the pixel on the boundary line 310 is 5 parts of each image. For example, the image pixels of the combined image 335 in the zone 315 can be produced according a blending function $z(n)=1/n*x+1/(10-n)*y$ where z is the combined image pixel in the zone, x is a pixel value from one image, y is a pixel value from the other image and n is a pixel position from left to right in the zone with a 10 pixel wide zone. The zone could have a different width to provide for a blending that is more gradual, such as be 100 pixels wide.

If each image is 1000 pixels wide, assuming that pixel counting is from left to right in the captured images, the pixels of the combined image from 0 to 544 could be obtained from the left captured image, the pixels from 545 to 554 (assuming a 10 pixel zone) could be blended using the zone function noted above, and from pixel 555 to 999 the pixels could be obtained from the right image.

Figure 3A:
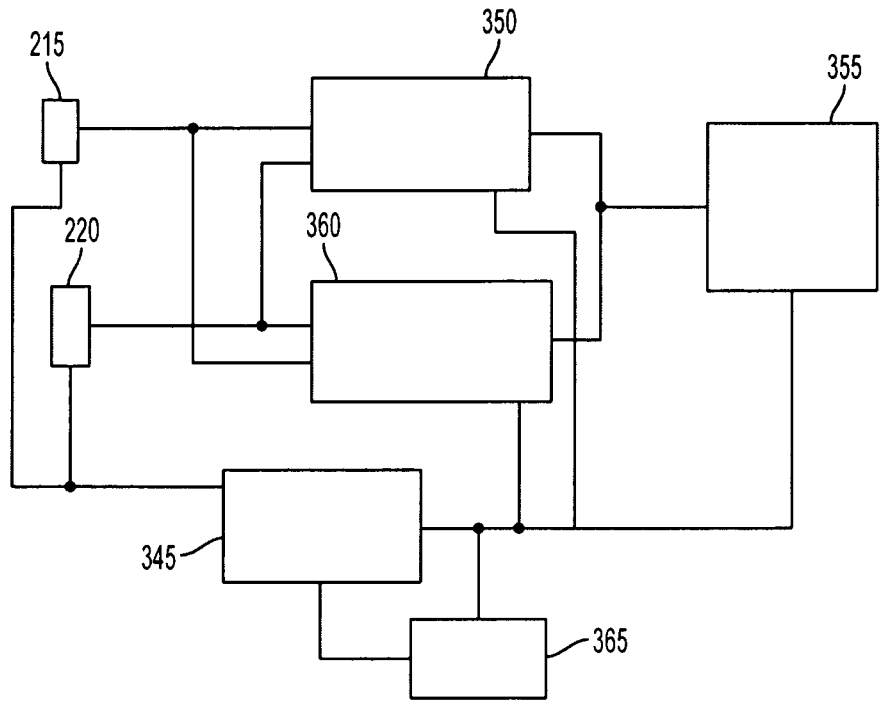
FIG. 3A shows a blending circuit.

This blending of the two images can be accomplished by the circuit 340 of FIG. 3A. A counter 345 can clock through the pixel locations and lines of first 215 and second 220 image sensors outputting the pixels from a line of the sensors to a selector 350. The selector 350 selects pixels from the first sensor 215 during the 0-544 count and from the second sensor 220 during the 555 to 999 count and supplies them to a memory 355 to be stored in a location based on the pixel and line count. A blending circuit 360 combines the pixels during the 545 to 555 count and supplies them to the memory 355. At the count of 1000, a reset and line increment circuit 365 can reset the pixel count to zero and increment a sensor line count.

The combining or blending ratio need not be linear and could be non-linear. The boundary need not be a straight line but could a curved line. The zone could extend the entire width/height of the images so that the blending can be a more complicated function based of other factors, such as the location of a zone of focus for each image. The blending could be user controlled, such as by allowing the user to set varying blending values by "painting" blending values on an image template.

Figure 3B:
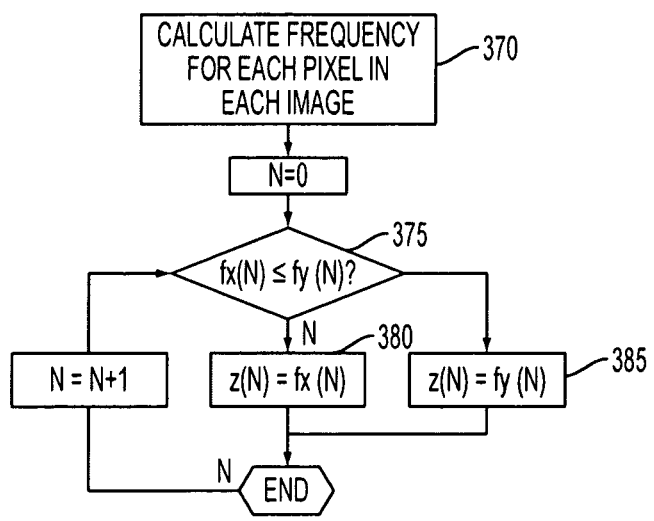
FIG. 3B depicts a blending technique using pixel frequency.

A focused image has object edges (or high levels of detail) that are sharp while an unfocused image has edges (or levels of detail) that are not sharp. Edges or areas of high detail have high spatial frequency components when transformed using a Fourier transform while unsharp edges have low frequency components when Fourier transformed. As a result, when the same part of a scene view in a focused part of an image of the view is compared to the same part of an image of the same scene view that is unfocused, the image part that has the highest spatial frequency is the most in focus. As a result, the images can be blended using spatial frequency. For example, a frequency or image detail value can be determined 370 for each of the pixels in the two captured images (see FIG. 3B). The frequency values for the corresponding pixels in each of the images can be compared 375 and the pixel that has the highest frequency can be stored 380 or 385 in the corresponding location in the combined image. In determining the spatial frequency for each pixel an n×n matrix of pixels centered on a target pixel whose frequency is to be determined or calculated can be used. The frequency of the matrix of pixels can be determined using, for example, a Fourier transform of the matrix and the transform result can be assigned to the target pixel. The target pixel is then stepped (horizontally and vertical) over the image so that a level of detail can be calculated for each pixel.

Figure 4:
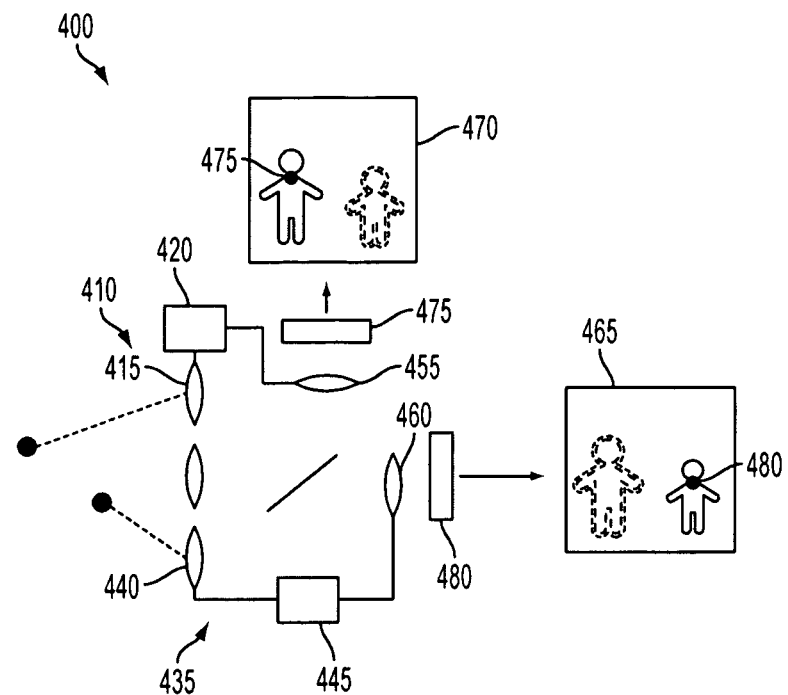
FIG. 4 depicts a system that uses autofocus.

The system discussed above allows the user(s) to manually adjust the focus of one or both of the images paths. A system 400 can also provide an autofocus capability for one or both of the image paths as depicted in FIG. 4. An autofocus system 410, that includes an autofocus imager 415 and an autofocus controller 420 can be used to autofocus on a far object 425 in a scene 430 while another autofocus system 435 that includes another autofocus imager 440 and another autofocus controller 445 can be used to autofocus on a near object 450 of the scene 430. The controllers 420 and 445 control the respective focusing lenses 455 and 460 so the images 465 and 470 captured by the image sensors 475 and 480 have the far object 425 in focus in one image 465 and the near object 450 in focus in the other image 470. The autofocus systems 410 and 435 can have autofocus locations or zones 475 and 480 in the scene located on the left and right side as shown in FIG. 4.

The autofocus zones or locations can be in fixed locations in the view of the scene. There can be several zones available in each system 410 and 435 allowing the user(s) to select an appropriate fixed location zone responsive to the objects visible in the view of the scene. The autofocus zones or locations can movable or adjustable by the user(s) so that they can be on opposite sides from as shown in FIG. 4, they can be located higher or lower in the scene image.

Figure 5:
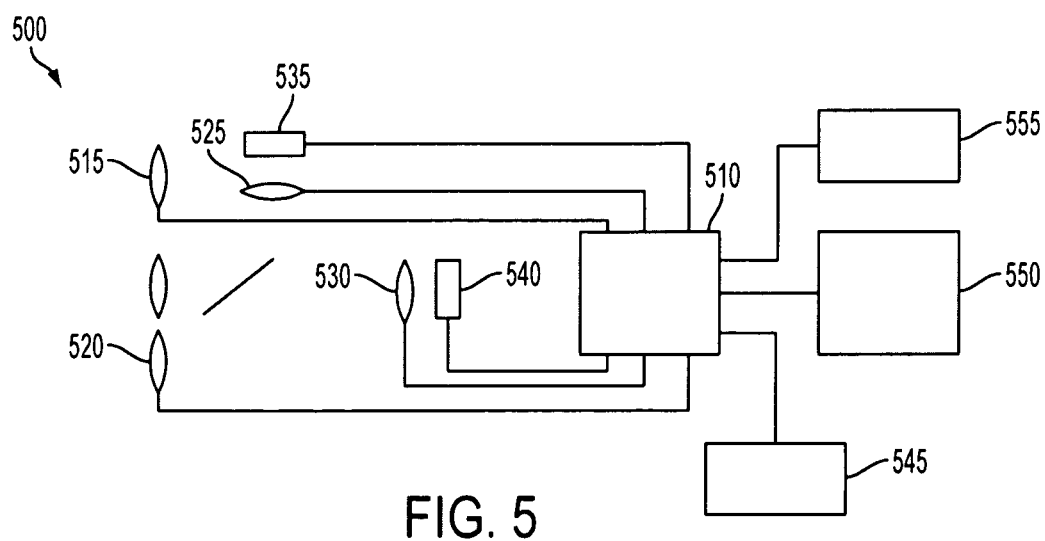
FIG. 5 shows a system controlled by a computer.

FIG. 5 illustrates a system 500 in which a camera processor or computer 510 receives inputs from autofocus imagers 515 and 520 and controls focusing lenses 525 and 530. The computer 510 also receives and processes the images from the sensors 535 and 540 for storage in an image memory 545, for display on a display 550, printing by a photo printer or for transmission by an output interface 555.

Figure 6:
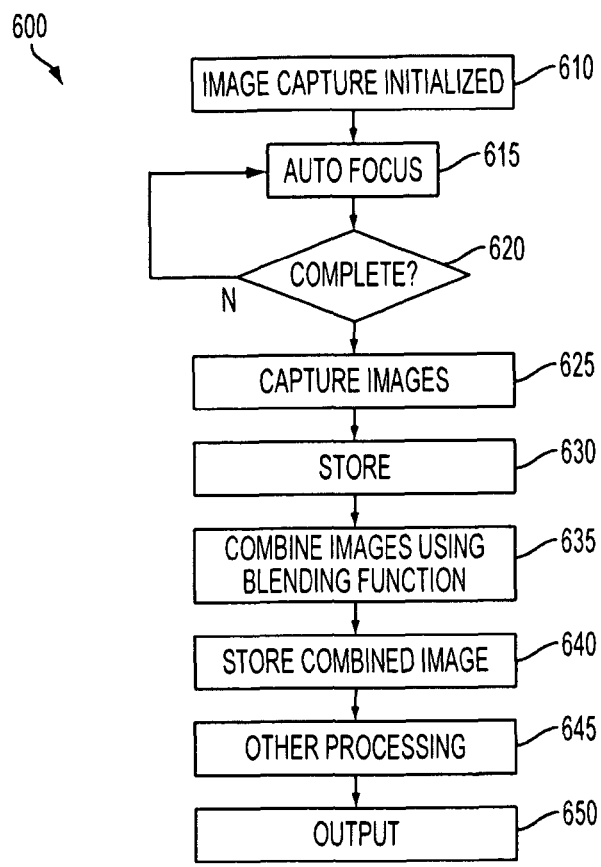
FIG. 6 illustrates a process.

A process 600, such as shown in FIG. 6, can be performed by the computer 510 of FIG. 5. When the capture of an image is initialized 610, such as by the user depressing the shutter button, or a video camera reaching the timing for capturing another image, the system performs 615 autofocus operations for both image paths. When both path focus operations are complete 620, the images are captured and downloaded 625 from the sensors and stored 630 in image memory. Next, the captured images are combined 635 using a blending function and the combined or blended image is stored 640. The combined image can be further processed 645 and stored as needed. For example, the light levels of the two images may need to be normalized as one image is reflected from the image splitter before being captured and the other image is transmitted through the splitter before being captured. The combined image is then output 650 to the display, and transmitted as needed. The processing discussed above is image based, that is, a captured image is processed. It is also possible to perform the processing as each pixel is downloaded from the sensors.

Figure 7:
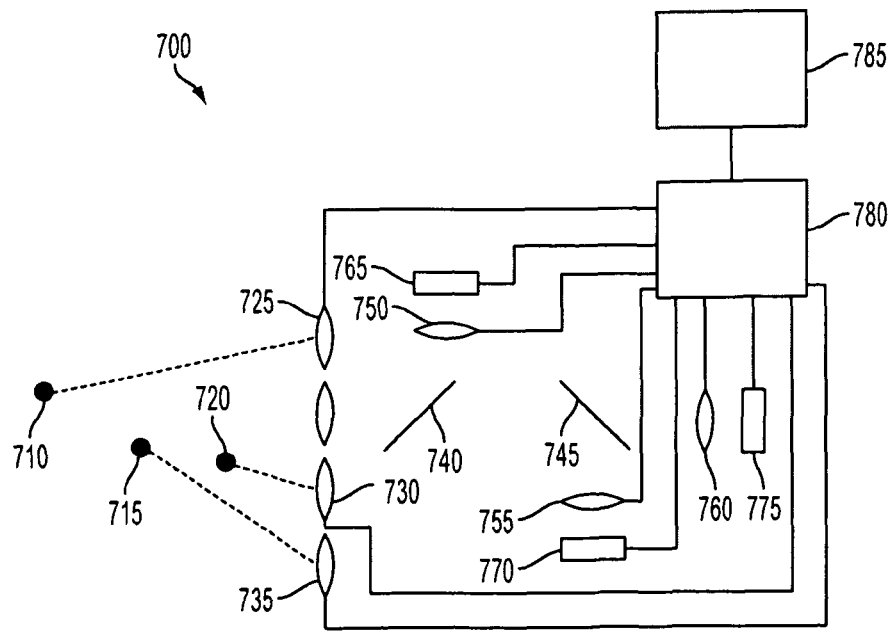
FIG. 7 illustrates a system that captures and processes three images.

FIG. 7 illustrates components of a system 700 that captures three images of three objects 710, 715, 720 at three different levels or depths of autofocus and can combine them into a single blended image. The system includes three autofocus imagers 725, 730 and 735, two image splitters 740 and 745, three focusing lenses 750, 755 and 760, three image sensors 765, 770 and 775, and a processor 780 with display 785. With a frequency blending function the pixels of all three captured images are compared and the pixel with the highest frequency is selected as the combined image pixel. More than three images can also be captured by increasing the number of splitters focusing optics and sensors. However, because the light level or brightness of the captured images varies due to the splitting, as the number of images increases and the number of image splitters increases, there arises a need for increased light level on the objects of the scene and/or additional signal processing to compensate for the different light levels reaching the sensors.

As discussed above, the system includes an image splitter that allows the view of the scene captured by the image sensors to be substantially the same. It is possible to have two independent image paths. The zone of the two image parts has been shown as essentially a straight zone; however, it can be irregularly shaped to accommodate various scenes. Other techniques for calculating a level of detail of a pixel than a Fourier transform can also be used.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. The program/software implementing the embodiments may also be transmitted over transmission communication media. Examples of the non-transitory computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc— Read Only Memory), and a CD-R (Recordable)/RW. An example of communication media includes a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A camera, comprising:
    a common image lens through which a scene image passes;
    a first visible image capture path having a first lens to focus a visible first part of the scene image at a first focus on a first focal plane at a magnification by moving the first lens and capture the first part of the scene using a first visible image sensor;
    a second visible image capture path at least in part separate from the first image capture path and having a second lens to focus a second visible part of the scene image adjacent (horizontally side by side) to the first part at a second focus on a second focal plane at a different distance from the camera than the first focal plane at the magnification by moving the second lens at a same time as the first lens focuses on the first part and capture the second part of the scene using a second visible image sensor at a same time as the first part of the scene is captured; and
    a combiner combining the first part of the scene at the first focus at an adjacent (horizontally side-by-side) position with the second part of the scene at the second focus to produce a visible output image with adjacent (horizontally side-by-side) first and second parts.

2. A camera as recited in claim 1, wherein a camera view of the scene includes a vertically oriented boundary between the first part and the second part and pixels on a first side of the boundary are placed on a first side of the output image and pixels on a second side of the boundary are placed on a second side of the output image.

3. A camera as recited in claim 2, wherein the boundary is non-linear.

4. A camera as recited on claim 1, wherein a camera view of the scene includes a boundary zone of the first part and the second part and pixels in the zone from the first part are blended with pixels in the zone from the second part.

5. A camera as recited in claim 4, wherein the blending is linear perpendicular to the boundary.

6. A camera as recited in claim 4, wherein the blending is based on edge frequency.

7. A camera as recited in claim 4, wherein the blending is based a distance from an abutting boundary edge.

8. A camera as recited in claim 1, further comprising a visible image splitter splitting an image path of a view of the scene into the first and second paths.

9. A camera as recited in claim 1, further comprising:
    a first autofocus system to focus on a first autofocus position in the first part of the scene for the first image capture path; and
    a second autofocus system to focus on a second autofocus position in the second part of the scene for the second image capture path at a same time as the first autofocus system focuses on the first part.

10. A camera as recited in claim 1, further comprising:
    a third image capture path having third lens to focus a third visible part of the scene at a third focus; and
    the combiner combining the first, second and third parts of the scene at the first, second and third focuses to produce an image.

11. A camera, comprising:
    a scene lens capturing a view of a visible light scene;
    a splitter splitting the view of the scene through the scene lens into first and second paths;
    a first autofocus system determining a first focus on a first focal plane at an apparent magnification for a first part of the view;
    a second autofocus system determining a second focus on a second focal plane at a different distance from the camera than the first focal plane at the magnification for a second part of the view (horizontally side-by-side with the first part);
    a first lens focusing the first part of the view of the first path responsive to the first focus by moving the first lens;
    a second lens focusing the second part of the view of the second path responsive to the second focus by moving the second lens;
    a first visible image sensor capturing a first visible image of the scene through the first lens;
    a second visible image sensor capturing a second visible image of the scene through the second lens at a same time as the capturing of the first visible image;
    a combiner combining the first and second parts of the first and second images into an output image with the images abutting (horizontally side-by-side) responsive to blending the first and second parts in a predetermined pixel width zone abutting boundary using a frequency blending function; and
    a display displaying the output image.

12. A camera as recited in claim 11, wherein the first and second parts are normalized responsive to the splitting.

13. A camera, comprising:
    a common image lens through which a scene image passes;
    a first visible image capture path having a first lens to focus a visible first part of the scene image at a first focus on a first focal plane at a magnification by moving the first lens and capture the first part of the scene using a first visible image sensor;
    a second visible image capture path at least in part separate from the first image capture path and having a second lens to focus a second visible part of the scene image adjacent (horizontally side-by-side) to the first part at a second focus on a second focal plane at a different distance from the camera than the first focal plane at the magnification by moving the second lens and capture the second part of the scene using a second visible image sensor at a same time as the first part of the scene is captured;
    a combiner combining the first part of the scene at the first focus at an adjacent (horizontally side-by-side) position with the second part of the scene at the second focus to produce a visible output image with adjacent (horizontally side-by-side) first and second parts;

a first autofocus system to focus on a first user adjustable autofocus position in the first part of the scene for the first image capture path; and a second autofocus system to focus on a second user adjustable autofocus position in the second part of the scene for the second image capture path.

* * * * *